United States Patent
Rudolph et al.

(10) Patent No.: US 10,150,382 B2
(45) Date of Patent: Dec. 11, 2018

(54) ADAPTER FOR A CONNECTIVITY SYSTEM

(71) Applicant: VOLKSWAGEN AG, Wolfsburg (DE)

(72) Inventors: Florian Rudolph, Wolfsburg (DE); Wolfgang Menssen, Braunschweig (DE); Ingo Zech, Wendeburg (DE); Matthias Kübel, Braunschweig (DE); Jörg Francis, Braunschweig (DE)

(73) Assignee: VOLKSWAGEN AG (DE)

( * ) Notice: Subject to any disclaimer, the term of this patent is extended or adjusted under 35 U.S.C. 154(b) by 300 days.

(21) Appl. No.: 15/088,712

(22) Filed: Apr. 1, 2016

(65) Prior Publication Data
US 2016/0288658 A1 Oct. 6, 2016

(30) Foreign Application Priority Data
Apr. 2, 2015 (DE) .................... 10 2015 206 047

(51) Int. Cl.
*B60L 11/18* (2006.01)
*B60L 3/00* (2006.01)
(Continued)

(52) U.S. Cl.
CPC .......... *B60L 11/185* (2013.01); *B60L 3/0046* (2013.01); *B60L 3/12* (2013.01); *B60L 11/14* (2013.01); *B60L 11/1818* (2013.01); *B60L 11/1846* (2013.01); *B60L 11/1861* (2013.01); *B60L 2240/545* (2013.01); *B60L 2240/547* (2013.01); *B60L 2240/549* (2013.01); *B60L 2250/16* (2013.01); *Y02T 10/70* (2013.01);
(Continued)

(58) Field of Classification Search
CPC ..................................................... B60L 11/185
USPC ........................................................ 320/109
See application file for complete search history.

(56) References Cited

U.S. PATENT DOCUMENTS

2006/0026017 A1* 2/2006 Walker ................... G06Q 10/00
                                                    701/31.4
2011/0057611 A1* 3/2011 Nakaso ................... B60K 6/365
                                                    320/109
(Continued)

FOREIGN PATENT DOCUMENTS

CN            103259826 A     8/2013
DE         102011107628 A1    1/2013
(Continued)

OTHER PUBLICATIONS

Search Report for German Patent Application No. 10 2015 206 047.0; dated Nov. 20, 2015.
(Continued)

*Primary Examiner* — Suresh Memula
(74) *Attorney, Agent, or Firm* — Barnes & Thornburg LLP (57) ABSTRACT

Adapter for the electric charging of an electric vehicle according to a vehicle-side plug-in charging system at a charging station according to a station-side plug-in charging system that is different from the vehicle-side plug-in charging system, the adapter having a charging socket according to the station-side plug-in charging system, a charging plug according to the vehicle-side plug-in charging system, a data interface according to a data communications technology of the vehicle-side plug-in charging system, and a data interface according to a data communications technology of the station-side plug-in charging system.

16 Claims, 5 Drawing Sheets

(51) Int. Cl.
 *B60L 3/12* (2006.01)
 *B60L 11/14* (2006.01)
(52) U.S. Cl.
 CPC .......... *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 90/121* (2013.01); *Y02T 90/128* (2013.01); *Y02T 90/14* (2013.01); *Y02T 90/16* (2013.01); *Y02T 90/169* (2013.01); *Y04S 30/14* (2013.01)

(56) References Cited

U.S. PATENT DOCUMENTS

| | | | |
|---|---|---|---|
| 2013/0169226 A1 | 7/2013 | Read | |
| 2013/0193918 A1* | 8/2013 | Sarkar | B60L 3/04 |
| | | | 320/109 |
| 2013/0214738 A1* | 8/2013 | Chen | H02J 5/00 |
| | | | 320/109 |
| 2013/0219084 A1 | 8/2013 | Wu et al. | |
| 2016/0036256 A1* | 2/2016 | Sukup | H02J 7/0052 |
| | | | 320/107 |
| 2016/0114686 A1* | 4/2016 | Beattie, Jr. | B60L 11/182 |
| | | | 320/108 |

FOREIGN PATENT DOCUMENTS

| | | |
|---|---|---|
| DE | 102013202591 A1 | 8/2014 |
| WO | 2014110107 A1 | 7/2014 |
| WO | 2014163618 A1 | 10/2014 |

OTHER PUBLICATIONS

Office Action for Chinese Patent Application No. 201610205076.7; dated Dec. 25, 2017.

* cited by examiner

ADAPTER FOR A CONNECTIVITY SYSTEM

PRIORITY CLAIM

This patent application claims priority to German Patent Application No. 10 2015 206 047.0, filed 2 Apr. 2015, the disclosure of which is incorporated herein by reference in its entirety.

SUMMARY

Illustrative embodiments relate to the field of plug-in charging systems for electric vehicles or hybrid vehicles, in particular plug-in charging systems that support fast charging.

BACKGROUND

A plug-in charging system serves as electrical interface between the battery management system of an electric vehicle and a charging station. A plug-in charging system typically comprises a charging plug, which has been connected to the charging station via a cable, and also a charging socket, which has been installed in an electric vehicle. For the charging process, the charging plug of the charging station is inserted into the charging socket of the electric vehicle.

In the course of fast charging, the battery management system of the electric vehicle controls the charging process intelligently. For this purpose, the charging station and the battery management system of the motor vehicle are in communication via a data interface. The data interface is realized via corresponding leads in the plug-in charging system.

Illustrative embodiments provide a plug-in charging system in such a way that the aforementioned drawbacks are at least partly overcome.

BRIEF DESCRIPTION OF THE DRAWINGS

Disclosed embodiments will now be described with reference to the appended drawings, in which.

DETAILED DESCRIPTION OF THE DISCLOSED EMBODIMENTS

Disclosed embodiments provide an adapter for the electric charging of an electric vehicle according to a vehicle-side plug-in charging system at a charging station according to a station-side plug-in charging system that is different from the vehicle-side plug-in charging system. The adapter comprises a charging socket according to the station-side plug-in charging system, a charging plug according to the vehicle-side plug-in charging system, a data interface according to a data communications technology of the vehicle-side plug-in charging system, the data communications technology of the vehicle-side plug-in charging system being based on a power-line transmission, and a data interface according to a data communications technology of the station-side plug-in charging system, the data communications technology of the station-side plug-in charging system being based on a CAN bus transmission. The disclosed adapter allows an electric vehicle to be charged with it at a CAN-based charging station even if the plug-in charging system of the electric vehicle is based on a power-line technology.

The disclosed adapter may exhibit a processing unit that is designed to convert data according to the data communications technology of the vehicle-side plug-in charging system into data according to the data communications technology of the station-side plug-in charging system, and/or conversely. An electric vehicle can be charged with it at a charging station even when the data communications technologies of the electric vehicle and of the charging station differ from one another.

The station-side plug-in charging system may be, for example, a CHAdeMO plug-in charging system. In this version, the adapter can, for example, be employed particularly well in countries in which the CHAdeMO plug-in charging system has a wide distribution.

The vehicle-side plug-in charging system may be, for example, a CCS plug-in charging system. An adapter designed in such a way may, for example, be used for charging electric vehicles that use the CCS plug-in charging system. If the adapter exhibits a CHAdeMO plug-in charging system as station-side plug-in charging system, and a CCS plug-in charging system as vehicle-side plug-in charging system, then an electric vehicle with a CCS plug-in charging system can be charged with the adapter at a charging station according to the CHAdeMO plug-in charging system, even though the plug-in charging systems thereof differ.

The processing unit may convert data according to a CAN bus protocol into data according to a power-line protocol. An electric vehicle functioning in accordance with the CCS/power-line plug-in charging system can consequently control a charging station functioning in accordance with the CHAdeMO/CAN plug-in charging system. This is beneficial, particularly in the case of fast charging.

In at least one disclosed embodiment, the adapter further exhibits a further vehicle-side communication interface which is based on pulse-width modulation, the processing unit further being designed to convert data according to a CAN bus protocol into data according to a pulse-width-modulation protocol. This allows for a fast-charging process a handshaking between charging station or adapter and battery management of the electric vehicle can take place only on the basis of pulse-width modulation, in the course of which handshaking it is ascertained whether the electric vehicle is suitable for fast charging. If this is confirmed in the course of handshaking, the charging process can switch over on the vehicle side to a power-line communication, by means of which the fast-charging process is then controlled.

Accordingly, the processing unit may be designed to convert the data flow in the case of a fast-charging process. A fast-charging process can take place even when the vehicle-side plug-in charging system and the station-side plug-in charging system differ.

In at least one disclosed embodiment, the adapter is portable. This is beneficial as the adapter can be carried in the electric vehicle by a keeper of the vehicle and can be used as needed for a charging of the electric vehicle, particularly if the electric vehicle is to be charged at a charging station having a plug-in charging system which differs from that of the electric vehicle.

But the adapter may also have been fixed to a charging station. Accordingly, by fixing of the adapter a charging station can be upgraded in such a manner that it also enables a charging of an electric vehicle having a plug-in charging system which differs from that of the charging station.

Disclosed embodiments also relate to a charging station according to a station-side plug-in charging system at which a disclosed adapter is employed to enable a charging of electric vehicles that support a vehicle-side plug-in charging system that is different from the station-side plug-in charging system.

An adapter is provided for the electric charging of an electric vehicle according to a vehicle-side plug-in charging system at a charging station according to a station-side plug-in charging system that is different from the vehicle-side plug-in charging system. The adapter comprises a charging socket according to the station-side plug-in charging system, a charging plug according to the vehicle-side plug-in charging system, a data interface according to a data communications technology of the vehicle-side plug-in charging system, and a data interface according to a data communications technology of the station-side plug-in charging system. The data communications technology of the vehicle-side plug-in charging system is based on a power-line transmission, and the data communications technology of the station-side plug-in charging system is based on a CAN bus transmission.

By the term 'electric vehicle', here any vehicle is to be understood, the tractive force of which is at least partly based on electrical energy. The electric vehicle may be a purely electrically based vehicle or may be a hybrid electric vehicle which, in addition to an electric motor, also exhibits an internal-combustion engine.

By means of the vehicle-side plug-in charging system, a traction battery of the electric vehicle, for example, can be charged.

By means of the data interface according to a data communications technology of the vehicle-side plug-in charging system, control commands that control the charging process, or data that describe charging parameters of the electric vehicle, for example, can be accepted by the electric vehicle.

By means of the data interface according to a data communications technology of the station-side plug-in charging system, control commands that control the charging process, or data that describe charging parameters of the electric vehicle, for example, can be sent to a charging station.

The power-line protocol may be, for example, an arbitrary communications protocol with which data are transported via current-carrying cables, by the current-carrying cables also being utilized for the purpose of transmitting data, in addition to supplying energy. The power-line protocol may be, for example, a communications protocol according to the "Powerline Green PHY" standard or such like. The current-carrying cable does not necessarily have to be the cable in which the charging current flows. In the case of the embodiment described below, the power-line communication takes place, for example, via the CCS contacts CP and PE.

Figure 1:
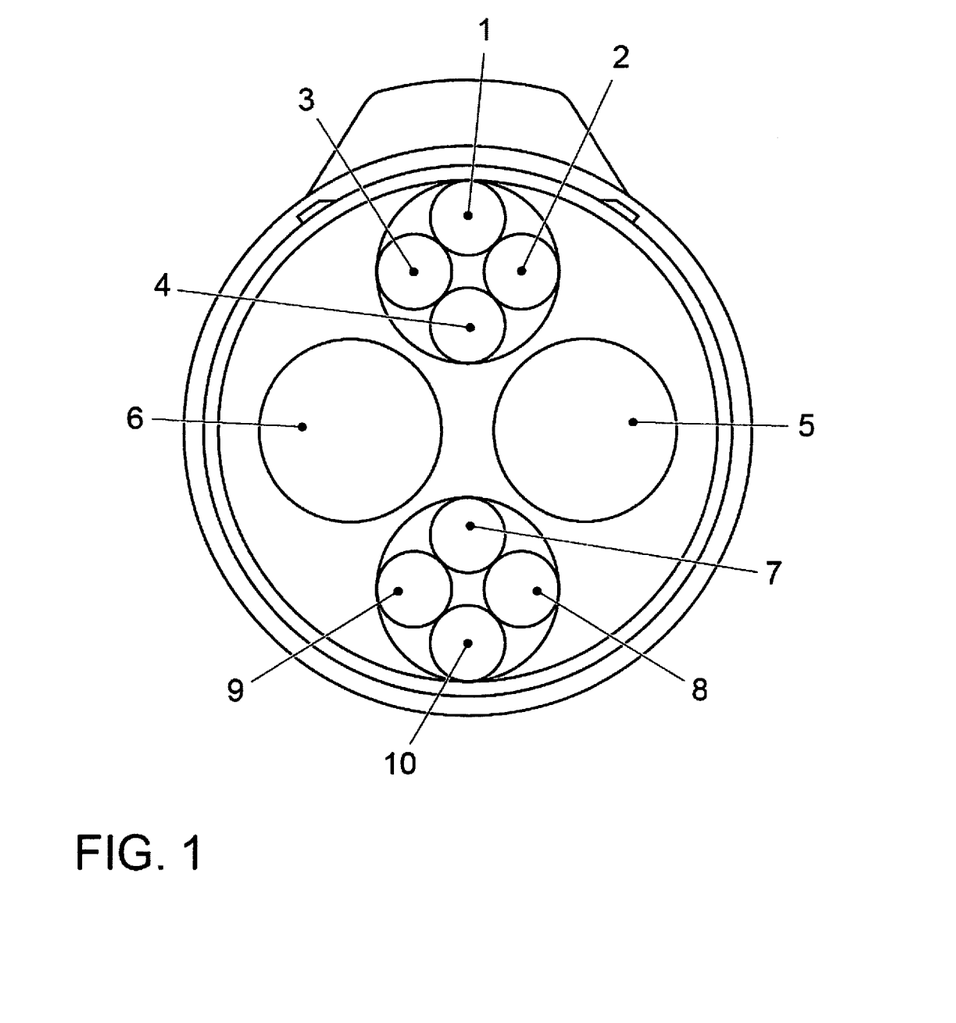
FIG. 1 shows schematically a disclosed embodiment of a charging plug according to a station-side plug-in charging system.

FIG. 1 shows schematically a disclosed embodiment of a charging plug according to a station-side plug-in charging system. The station-side charging plug of this disclosed embodiment is a charging plug according to the CHAdeMO plug-in charging system. FIG. 1 shows, in particular, a pin layout of the charging plug. Pin 1 is the ground lead serving as reference and protection. Pins 2 and 10 serve for controlling an EV relay. Pin 3 is not allocated. Pin 4 serves for the indication of readiness for the charging control ("ready to charge"). Pin 5 serves as negative lead of the power supply. Pin 6 serves as positive lead of the power supply. Pin 7 serves for the signals of a proximity detector. Pin 8 serves as positive lead of a data communication. Pin 9 serves as negative lead of the data communication.

Figure 2:
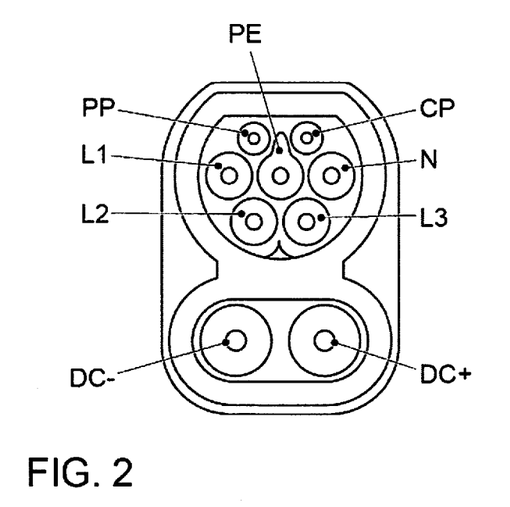
FIG. 2 shows schematically a disclosed embodiment of a charging socket according to a vehicle-side plug-in charging system.

FIG. 2 shows schematically a disclosed embodiment of a charging socket according to a vehicle-side plug-in charging system. The charging socket of this disclosed embodiment is a charging socket according to the CCS plug-in charging system. FIG. 2 shows, in particular, a pin layout of the charging plug. Pin PE (protective earth) is the ground lead (protective contact) serving as reference and protection. Pin N serves as neutral conductor. Pin CP (control pilot) serves for dialog between charging station and vehicle by means of analog signal. Pin PP (proximity pilot) serves for limiting the charging current by means of resistance coding, so that the charging cable being used is not overloaded. Pins DC+ and DC− are positive terminal and negative terminal, respectively, for the d.c. charging. Pins L1, L2 and L3 are three outer-conductor contacts for the a.c. charging and d.c. charging.

Figure 3:
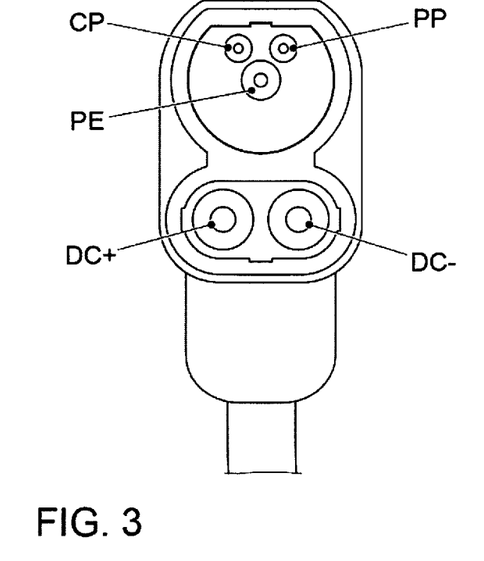
FIG. 3 shows schematically a disclosed embodiment of a charging plug according to a vehicle-side plug-in charging system.

FIG. 3 shows schematically a disclosed embodiment of a charging plug according to a vehicle-side plug-in charging system. The vehicle-side charging plug of this disclosed embodiment is once again a charging plug according to the CCS plug-in charging system, in particular a charging plug designated as Combo 2 for fast charging by means of direct current. FIG. 3 shows, in particular, a pin layout of the Combo 2 charging plug. Pin PE (protective earth) is the ground lead (protective contact) serving as reference and protection. Pin CP (control pilot) serves for the data communication between charging station and vehicle. Pin PP (proximity pilot) serves for limiting the charging current by means of resistance coding, so that the charging cable being used is not overloaded. Pins DC+ and DC− are positive terminal and negative terminal, respectively, for the d.c. charging.

In the case of CCS, three charging zones, Level 1 (IEC 61851 Mode 1), Level 2 (IEC 61851 Mode 2) and Level 3 (61851 Mode 4) are distinguished. "Level 1" with 230 volts and maximally 16 amperes is utilized in the case of connection to simple domestic electrical sockets in which grounding can be effected via the neutral conductor. "Level 2" permits the utilization of the appliance terminals with 230 volts with maximally 32 amperes monophase (to neutral conductor) or polyphase (between outer conductors). "Level 3" designates the fast charging with d.c. current with up to 400 amperes.

Figure 4:
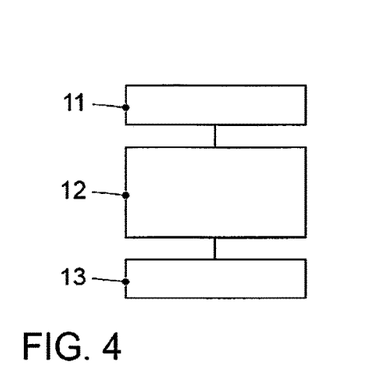
FIG. 4 shows schematically a disclosed embodiment of a processing unit of an adapter.

FIG. 4 shows schematically a disclosed embodiment of a processing unit of an adapter. The processing unit 12 has been communicatively coupled with a vehicle-side data interface 11 and with a station-side data interface 13. The vehicle-side data interface 11 of this disclosed embodiment is a data interface that is designed to accept or emit data according to the CCS protocol. The station-side data interface 13 of this disclosed embodiment is a data interface that is designed to accept or emit data according to the CHAdeMO protocol. The processing unit 12 is designed to convert data according to the CCS protocol into data according to the CHAdeMO protocol, and/or conversely.

Figure 5:
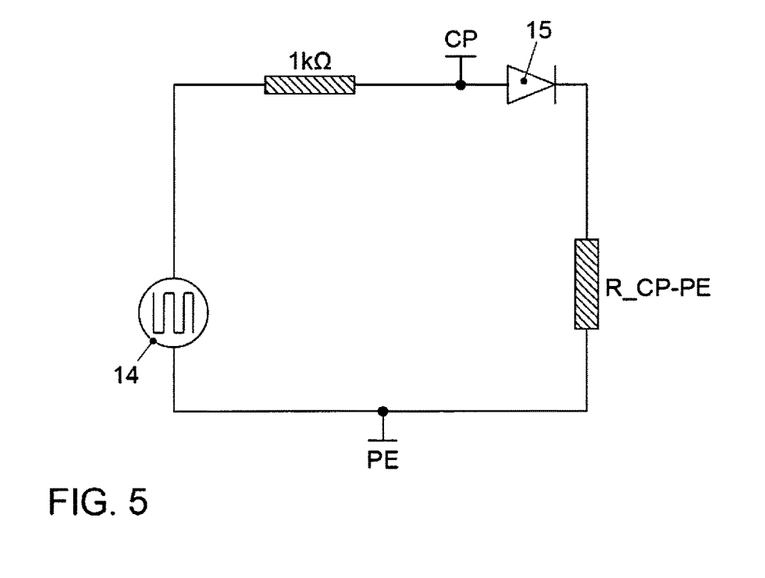
FIG. 5 shows schematically a disclosed embodiment of a vehicle-side data interface of the adapter.

FIG. 5 shows schematically a disclosed embodiment of a vehicle-side data interface of the disclosed adapter. The vehicle-side data interface of this disclosed embodiment is an analog data interface according to the CCS standard IEC 61851. The data communication from the charging station to the electric vehicle takes place by means of pulse-width modulation via a square-wave voltage 14, for example a 1 kHz square-wave voltage. The charging station applies a voltage of 12 volts to the pilot contact CP and to the proximity contact PP. As shown in FIG. 5, the charging station further applies the square-wave voltage 14 between pilot contact CP and the protective conductor PE via a 1 kiloohm resistor. At the electric vehicle the electric circuit between CP and PE is closed by a resistor R_CP-PE which has been connected in series to a diode 15.

By means of pulse-width modulation of the square-wave voltage, the vehicle-side data interface reports the maximum power that can be provided by the charging station to the electric vehicle. Data communication from the vehicle-side data interface to the electric vehicle may, for example, take place as follows:

| | |
|---|---|
| 16% PWM | maximum 10 A |
| 25% PWM | maximum 15 A |
| 50% PWM | maximum 30 A |

The electric vehicle can communicate with the processing unit in the adapter via the setting of the resistance R_CP-PE and of an associated change in the fall in voltage at the 1 kiloohm resistor of the vehicle-side data interface. Data communication from the electric vehicle to the vehicle-side data interface of the adapter may, for example, take place as follows:

| | |
|---|---|
| R_CP-PE = 700 ohm ("vehicle detected") | Mode 3 compatible vehicle |
| R_CP-PE = 880 ohm ("ready") | ready for charging current |
| R_CP-PE = 240 ohm ("with ventilation") | additional demand for ventilation |

Furthermore, the proximity contact PP also reports the maximum possible charging current of the vehicle to the adapter. For this purpose a resistance R_PP-PE is set between PP and PE.

R_PP-PE=100 ohm 63 A
R_PP-PE=220 ohm 32 A
R_PP-PE=680 ohm 20 A
R_PP-PE=1500 ohm 13 A In FIG. 5 an analog data interface according to the CCS standard IEC 61851 has been presented as an example.

Figure 6:
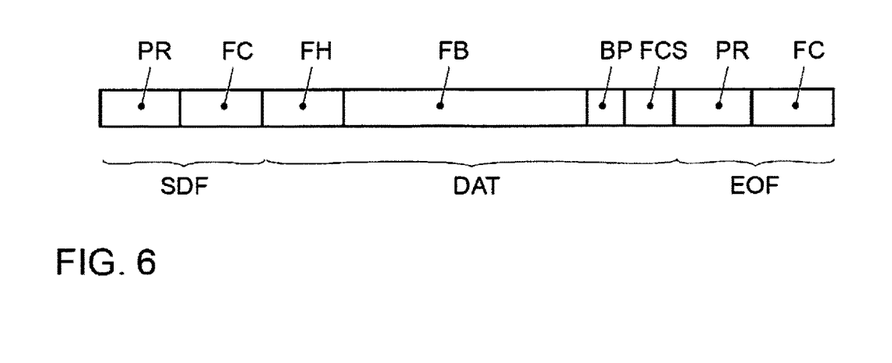
FIG. 6 shows schematically a further disclosed embodiment of a vehicle-side data interface of the adapter.

FIG. 6 shows schematically a further disclosed embodiment of a vehicle-side data interface of the disclosed adapter. The vehicle-side data interface shown in FIG. 6 is a data interface that is based on the power-line communications technology (PLC) with which signals are modulated onto one or more carrier frequencies in a current-carrying cable by means of a modem. In this disclosed embodiment it is a question, in particular, of a modem according to the HomePlug Green PHY standard, in the case of which the power-line communication takes place via the contacts CP and PE. FIG. 6 shows a data frame according to the HomePlug Green PHY communications protocol. The data frame consists, on the logical level, of three fields: a start-frame delimiter field SOF, a user-data field DAT and an end-frame delimiter field EOF. The start-frame delimiter field SOF comprises a preamble field PR and a frame-control field FC of length 25 bits or 4 symbols. The frame-control field FC contains, for example, information about type and priority of the frame. The user-data field DAT comprises a frame-header field FH of length 17 bits, a frame-body field FB of variable length, a BPath field of variable length and an FCS field FCS of length two bits. The frame-header field FH of the user-data field comprises information about originator and destination of the frame. Transmission errors in the user data can be recognized with the frame-check-sequence field (FCS). The end-frame delimiter field EOF comprises a preamble field PR and a frame-control field FC of length 25 bits or 4 symbols.

In another disclosed embodiment, on the vehicle side the data communication based on pulse-width modulation is supplemented by a power-line based (PLC) bidirectional digital communication channel. In this case, a power-line modem is used additionally as vehicle-side data interface, which transmits or receives data bidirectionally in accordance with a PLC protocol. The electric vehicle or the battery management system (BMS) of the electric vehicle likewise exhibits a power-line modem which sends or receives data in accordance with the same PLC protocol. Accordingly, a data communication between the processing unit of the adapter and the battery management system of the electric vehicle can take place via PLC. In this way, in a first phase it can be checked by pulse-width modulation whether the electric vehicle is suitable for fast charging (cf. "vehicle detected": Mode 3 compatible vehicle in the disclosed embodiment above). If in this way it is recognized that the electric vehicle is suitable for fast charging, the system switches over to a data communication on the basis of the power-line protocol.

A station-side data interface may be designed in accordance with corresponding principles.

The exemplary station-side data interface has been set up to receive and to transmit data in accordance with the CHAdeMO protocol. The data interface has been connected to pins 8 and 9 of a CHAdeMO socket of the adapter, which serve as positive lead and as negative lead, respectively, of the data communication. The data interface receives or transmits data in accordance with the CHAdeMO protocol, so that the processing unit of the adapter can accept and evaluate data according to the CHAdeMO protocol from a CHAdeMO charging station and can convert the data into the vehicle-side protocol. Equally, the processing unit of the adapter can convert data received on the vehicle side into the CHAdeMO protocol and transmit the data to the charging station by means of the station-side data interface. The CHAdeMO protocol is based on a transmission of data by means of the CAN bus protocol.

Figure 7:
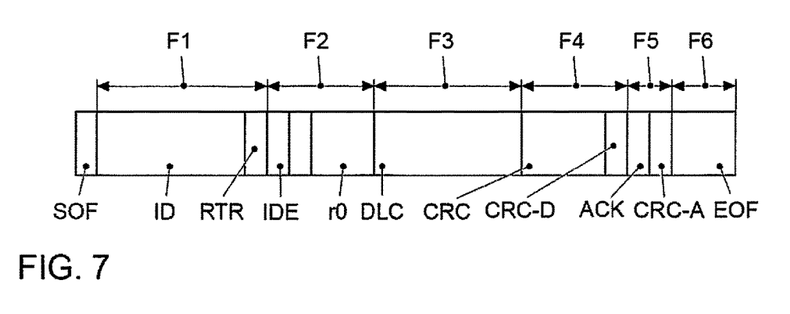
FIG. 7 shows schematically a disclosed embodiment of a station-side data interface of the adapter.

FIG. 7 shows schematically a disclosed embodiment of a station-side data interface of the disclosed adapter, in particular a data frame according to the CAN bus protocol. The CAN bus is based on a digital transmission of data. A data frame consists, on the logical level, of six fields: a switching field F1, a control field F2, a data field F3, a check field F4, an acknowledgement field F5 and an end field F6. The data frame begins with a start-of-frame bit SOF which specifies the start of the frame. This is followed by an 11 bit identifier field ID, an RTR bit which specifies whether it is a question of a data frame or a remote-transmission-request frame. An identifier extension IDE with a length of 1 bit specifies whether it is a question of a 29 bit identifier frame or an 11 bit identifier frame. This is followed by a reserved bit r0, followed by a data-length code DLC which as a 3 bit field specifies how many data bytes the frame contains or how many bits are queried in the case of an RTR frame. This is followed by the data field DLC, which may comprise up to 8 data bytes. The data field DLC is followed by a cyclic-redundancy-check field CRC which is a 15 bit checksum field. The field ends with a checksum distance bit CRC-D. This is followed by an acknowledge field ACK which comprises 2 bits and which in turn is followed by a distance bit ACK-D. The acknowledge field ACK is used by a receiving node to confirm the correct reception of a frame. The data frame ends with an end-of-frame EOF of length 7 bits.

The processing unit of the adapter can now communicate with the charging station in accordance with the CHAdeMO protocol or the CAN bus protocol and, for example, can receive particulars transmitted by means of the data field concerning the maximum charging power of the charging station. The processing unit can evaluate these received data and convert them into a vehicle-side communications protocol; for example, in accordance with the received data it can perform an appropriate pulse-width modulation of a square-wave voltage, to communicate to the battery management of the electric vehicle the maximum charging power according to the vehicle-side communications protocol, as elucidated with reference to the vehicle-side interface shown in FIG. 5. If the processing unit receives, for example, a maximum charging power of 15 A from the charging station, then at the vehicle-side data interface a pulse-width modulation of 25% PWM may take place, signaling a maximum charging power of 15 A to the electric vehicle. A handshaking may also take place on this basis, in the course of which the electric vehicle signals to the charging station that it is suitable for fast charging.

If, finally, a PLC protocol is used on the vehicle side for the data communication in the case of fast charging, then the processing unit can convert a station-side data frame according to the CHAdeMO protocol or to the CAN bus protocol into a corresponding station-side data frame according to the PLC protocol, in that it reads out the fields of a data frame according to the CHAdeMO/CAN protocol received from the charging station and generates a PLC frame with corresponding content and sends it to the electric vehicle, or conversely.

Figure 8:
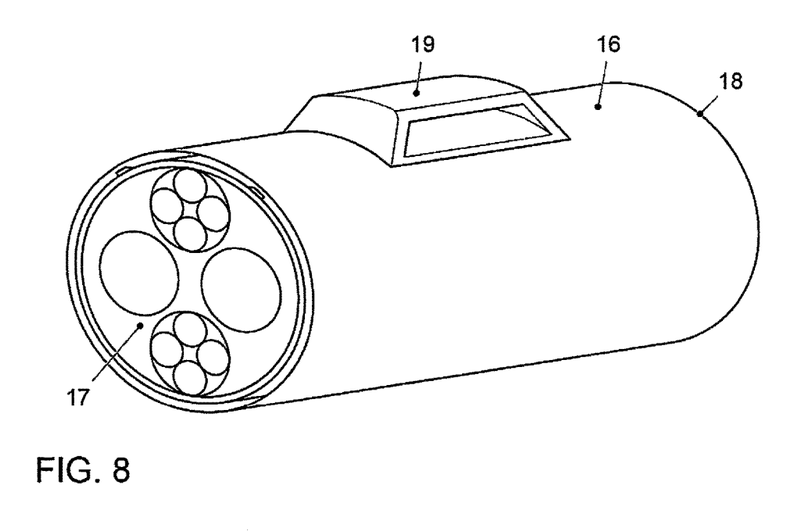
FIG. 8 shows a schematic perspective view of an exemplary adapter.

FIG. 8 shows a schematic perspective view of an exemplary adapter. The adapter exhibits an adapter housing 16 in which the processing unit, the vehicle-side data interface and the station-side data interface (not visible in FIG. 6) are contained. On the station side the adapter exhibits a CHAdeMO socket 17. On the vehicle side the adapter exhibits a CCS plug 18 (concealed in FIG. 6). The adapter shown in FIG. 8 is designed to be portable. A carrying handle 19 enables a user to transport the adapter and to plug it onto the charging plug of a CHAdeMO charging station, so that a CCS electric vehicle can be charged at the CHAdeMO charging station.

A plug-in charging system serves as electrical interface between the battery management system of an electric vehicle and a charging station. A plug-in charging system typically comprises a charging plug, which has been connected to the charging station via a cable, and also a charging socket, which has been installed in an electric vehicle. For the charging process, the charging plug of the charging station is inserted into the charging socket of the electric vehicle.

In the course of fast charging, the battery management system of the electric vehicle controls the charging process intelligently. For this purpose, the charging station and the battery management system of the motor vehicle are in communication via a data interface. The data interface is realized via corresponding leads in the plug-in charging system.

Various mutually competing plug-in charging systems are known nowadays that support fast charging.

The CHAdeMO plug-in charging system is based, for example, on d.c. voltage, and supports an electric charging power of up to 62.5 kW. CHAdeMO charging communication is effected via the CAN protocol and via two CAN lines, as well as separate signal lines. In the case of the CHAdeMO protocol, the battery management system of the car connects to the computer of the fast-charging station to form a master/slave system. The battery management system of the car (master) signals to the charging station (slave) charging parameters such as the present state of charge of a traction battery, as well as the d.c. voltage and maximum current intensity with which the traction battery is permitted to be charged. Furthermore, parameters such as voltage, temperature and other parameters of the traction battery are transmitted. The CHAdeMO protocol is acknowledged as the d.c. charging standard within the scope of ISO standardization and has been adopted as standards ISO/IEC 61851-23 and ISO/IEC 61851-24.

The Combined AC/DC Charging System (CCS) is a plug-in charging system for electric vehicles that supports both a.c. charging and d.c. charging. CCS is standardized according to international standard IEC 62196 and is in force in Germany as DIN standard DIN EN 62196. IEC 61851-1 "Mode 3" provides for fast charging up to 250 A. IEC 61851-1 "Mode 4" supports fast charging up to 400 A with control by an external charger. The plug of Type 2, for example, standardized in accordance with IEC 62196-2: 2011, serves as charging plug and socket. In future, the Type 2 plug in combination with Mode 3 is to be employed in the EU as a unified solution and is also to be used for fast d.c. charging for the Combo 2 plug (according to IEC 62196-3: 2014). The charging communication is effected in the case of CCS via pulse-width modulation of a rectangular oscillation. For fast charging, this communications technology is upgraded by means of an interface based on digital power-line communication (PLC).

The named plug-in charging systems CHAdeMO and CCS are not compatible with one another. That is to say, a motor vehicle with a CCS charging socket cannot be charged with a CHAdeMO charging station.

From U.S. patent application US 2013/0169226 A1 an adapter with an intelligent module for an electric vehicle-battery charging station is known which modifies the charging station in such a manner that the latter becomes an intelligent charging station. The adapter exhibits an adapter input, for a connection of a charging station, and an adapter output for a connection of a battery system of a motor vehicle. The intelligent module can, for example, communicate with the battery management of the motor vehicle via a CAN bus, to retrieve charging parameters such as a state of charge or a battery temperature, for example. The intelligent module can, furthermore, control the charging process via an operating module inserted between the adapter input and the adapter output, for example to restrict the charging process to times at which the electricity costs are lower. The adapter from US 2013/0169226 A1, however, is not designed for operation with an intelligent charging station. It cannot therefore be employed in fast-charging stations.

From international patent application WO 2014/110107 A1 an intelligent charging station is known that exhibits an authorization component. The charging station receives identification information from the motor vehicle, which is utilized by the authorization component to authorize a charging process. In the charging station described in WO 2014/110107 A1, however, the charging station and the motor vehicle have to utilize the same connecting system—that is to say, the charging plug of the charging station has to match the charging socket of the motor vehicle.

From U.S. patent application US 2013/0219084 A1 a multi-standard-compatible charging station is furthermore known which exhibits a data communication unit that has an external interface for the communication with a battery management system, as well as an internal interface for the communication with a power converter. The charging station described in WO 2014/163618 A1, however, is technically elaborate in its realization, since it has to implement several charging standards. In addition, it can only be adapted with difficulty to further developments of charging standards.

From international patent application WO 2014/163618 A1 an adapter for a charging system is furthermore known that operates between a CHAdeMO charging station and an electric vehicle on the basis of the SAE J1772 technology. The adapter utilizes a boost converter to supply energy to the bus before the electric vehicle connects to the bus. This adapter, however, is not suitable for fast charging.

LIST OF REFERENCE SYMBOLS

1 Ground lead
2 Control, EV relay
3 not allocated
4 Ready to charge
5 Power supply (negative)
6 Power supply (positive)
7 Signals, proximity detector
8 Data communication (positive)
9 Data communication (negative)
10 Control, EV relay
PE Protective earth
N Neutral conductor
CP Control pilot
PP Proximity pilot
L1 Outer-conductor contact 1
L2 Outer-conductor contact 2
L3 Outer-conductor contact 3
DC+ D.c. charging (positive)
DC− D.c. charging (negative)
11 Vehicle-side data interface
12 Processing unit
13 Station-side data interface
14 Square-wave voltage (1 kHz)
R_CP-PE Resistor
15 Diode
16 Adapter housing
17 CHAdeMO socket
18 CCS plug
19 Carrying handle
SDF SOF delimiter field
PR Preamble field
FC Frame-control field (25 bits)
FH Frame-header field (17 bits)
FB Frame body
BP BPath
FCS Frame-check-sequence field (2 bits)
DAT Data field
EOF End of frame
F1 Switching field (CAN)
F2 Control field (CAN)
F3 Data field (CAN)
F4 Check field (CAN)
F5 Acknowledgement field (CAN)
F6 End field (CAN)
SOF Start-of-frame bit
ID 11 bit identifier field,
RTR RTR bit
IDE Identifier extension (1 bit)
r0 reserved bit
DLC Data-length code (3 bits)
DLC Data field
CRC Cyclic-redundancy-check field (15 bits)
CRC-D Checksum distance bit
ACK Acknowledge field (2 bits)
ACK-D Distance bit
EOF End of frame (7 bits)

The invention claimed is:

1. An adapter for electric charging of an electric vehicle using a vehicle-side plug-in charging system at a charging station that uses a station-side plug-in charging system that is different from the vehicle-side plug-in charging system, the adapter comprising:
 a station-side plug-in charging system charging socket;
 a vehicle-side plug-in charging system charging plug;
 a data interface using a data communications technology of the vehicle-side plug-in charging system, the data communications technology of the vehicle-side plug-in charging system being based on a power-line transmission;
 a data interface using a data communications technology of the station-side plug-in charging system, the data communications technology of the station-side plug-in charging system being based on a CAN bus transmission; and
 a processing unit which converts data for the data communications technology of the vehicle-side plug-in charging system into data for the data communications technology of the station-side plug-in charging system, and/or conversely, wherein the processing unit converts data flow during a fast-charging process by converting data according to a CAN bus protocol into data according to a pulse-width-modulation protocol, thereby enabling the fast-charging process by performing a handshake between the charging station or adapter and the battery management of the electric vehicle only on a basis of the pulse-width modulation, wherein, in response to the handshaking indicating that the electric vehicle is suitable for fast charging, the charging process on the vehicle side is switched over to a power-line communication.

2. The adapter of claim 1, wherein the station-side plug-in charging system is a CHAdeMO plug-in charging system.

3. The adapter of claim 1, wherein the vehicle-side plug-in charging system is a CCS plug-in charging system.

4. The adapter of claim 1, wherein the processing unit converts data for CHAdeMO protocol into data for CCS protocol.

5. The adapter of claim 1, further comprising a further vehicle-side communication interface based on pulse-width modulation, wherein the processing unit converts data for CAN bus protocol into data for pulse-width-modulation protocol.

6. The adapter of claim 1, wherein the adapter is portable.

7. A charging station of a station-side plug-in charging system comprising an adapter for electric charging of an electric vehicle using a vehicle-side plug-in charging system that is different from the charging station station-side plug-in charging system wherein the adapter includes:
- a station-side plug-in charging system charging socket; a vehicle-side plug-in charging system charging plug;
- a data interface using a data communications technology of the vehicle-side plug-in charging system, the data communications technology of the vehicle-side plug-in charging system being based on a power-line transmission;
- a data interface using a data communications technology of the station-side plug-in charging system, the data communications technology of the station-side plug-in charging system being based on a CAN bus transmission; and
- a processing unit which converts data for the data communications technology of the vehicle-side plug-in charging system into data for the data communications technology of the station-side plug-in charging system, and/or conversely, wherein the processing unit converts data flow during a fast-charging process by converting data according to a CAN bus protocol into data according to a pulse-width-modulation protocol, thereby enabling the fast-charging process by performing a handshake between the charging station or adapter and the battery management of the electric vehicle only on a basis of the pulse-width modulation, wherein, in response to the handshaking indicating that the electric vehicle is suitable for fast charging, the charging process on the vehicle side is switched over to a power-line communication.

8. The charging station of claim 7, wherein the station-side plug-in charging system is a CHAdeMO plug-in charging system.

9. The charging station of claim 7, wherein the vehicle-side plug-in charging system is a CCS plug-in charging system.

10. The charging station of claim 7, wherein the processing unit converts data for CHAdeMO protocol into data for CCS protocol.

11. The charging station of claim 7, further comprising a further vehicle-side communication interface based on pulse-width modulation, wherein the processing unit converts data for CAN bus protocol into data for pulse-width-modulation protocol.

12. A method of adapting a charging station of a station-side plug-in charging system using an adapter for electric charging of an electric vehicle using a vehicle-side plug-in charging system that is different from the charging station station-side plug-in charging system, the method comprising:
- providing an adapter that includes a station-side plug-in charging system charging socket, a vehicle-side plug-in charging system charging plug, a data interface using a data communications technology of the vehicle-side plug-in charging system, the data communications technology of the vehicle-side plug-in charging system being based on a power-line transmission, and a data interface using a data communications technology of the station-side plug-in charging system, the data communications technology of the station-side plug-in charging system being based on a CAN bus transmission, the adapter including a processing unit for conversion of data between the station-side plug-in charging system and the vehicle-side plug-in charging system; and
- converting data for the data communications technology of the vehicle-side plug-in charging system into data for the data communications technology of the station-side plug-in charging system, and/or conversely,
- wherein the processing unit further converts data for the data communications technology of the vehicle-side plug-in charging system into data for the data communications technology of the station-side plug-in charging system, and/or conversely, wherein the processing unit converts data flow during a fast-charging process by converting data according to a CAN bus protocol into data according to a pulse-width-modulation protocol, thereby enabling the fast-charging process by performing a handshake between the charging station or adapter and the battery management of the electric vehicle only on a basis of the pulse-width modulation, wherein, in response to the handshaking indicating that the electric vehicle is suitable for fast charging, the charging process on the vehicle side is switched over to a power-line communication.

13. The method of claim 12, wherein the station-side plug-in charging system is a CHAdeMO plug-in charging system.

14. The method of claim 12, wherein the vehicle-side plug-in charging system is a CCS plug-in charging system.

15. The method of claim 12, wherein the processing unit converts data for CHAdeMO protocol into data for CCS protocol.

16. The method of claim 12, further comprising providing a vehicle-side communication interface based on pulse-width modulation, wherein the processing unit converts data for CAN bus protocol into data for pulse-width-modulation protocol.

* * * * *